United States Patent [19]

Dulondel

[11] 4,357,551

[45] Nov. 2, 1982

[54] D.C. IMPULSION MOTOR

[76] Inventor: Jacques Dulondel, 50 Willowdale Ave.-Apt. 701, Outremont, Quebec H3T 1G1, Canada

[21] Appl. No.: 244,096

[22] Filed: Mar. 16, 1981

[51] Int. Cl.³ .............................................. H02K 47/00
[52] U.S. Cl. ...................................................... 310/46
[58] Field of Search .......................................... 310/46

[56]  References Cited
U.S. PATENT DOCUMENTS

| 3,305,717 | 2/1967 | Weiss . |
| 3,331,973 | 7/1967 | McClure . |
| 3,914,629 | 10/1975 | Gardiner . |
| 4,025,807 | 5/1977 | Clover . |
| 4,080,544 | 3/1978 | Aoki . |
| 4,142,119 | 2/1979 | Madey . |

OTHER PUBLICATIONS

"Magnetic 'Waukel' for Electric Cars", *Popular Science*, Jun. 1979, pp. 80–81.

*Primary Examiner*—Donovan F. Duggan

[57]  ABSTRACT

A d.c. motor that operates by electromagnetic impulsions rather than through continuous electrical energization and which is characterized by permanent rotor magnets reactively associated to permanent stator magnets that produce rotary action on the permanent rotor magnets by being made of progressively increasing or decreasing width circumferentially around the rotor and of appropriate polarity to either produce a net magnetic attraction or repulsion on the permanent rotor magnets.

12 Claims, 12 Drawing Figures

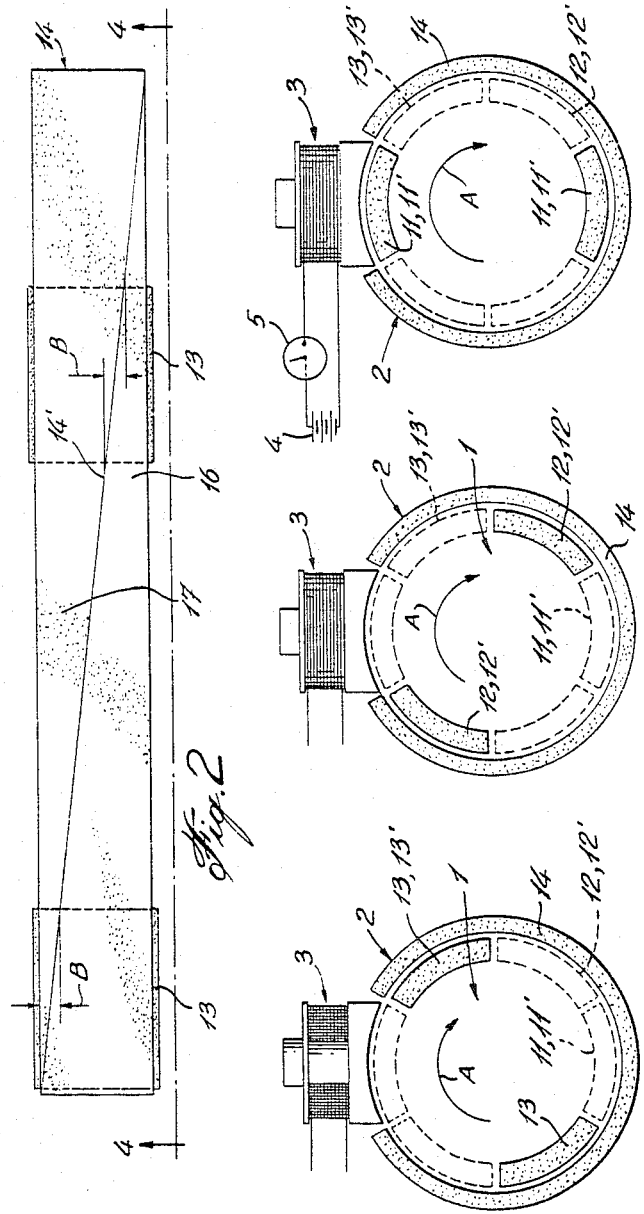

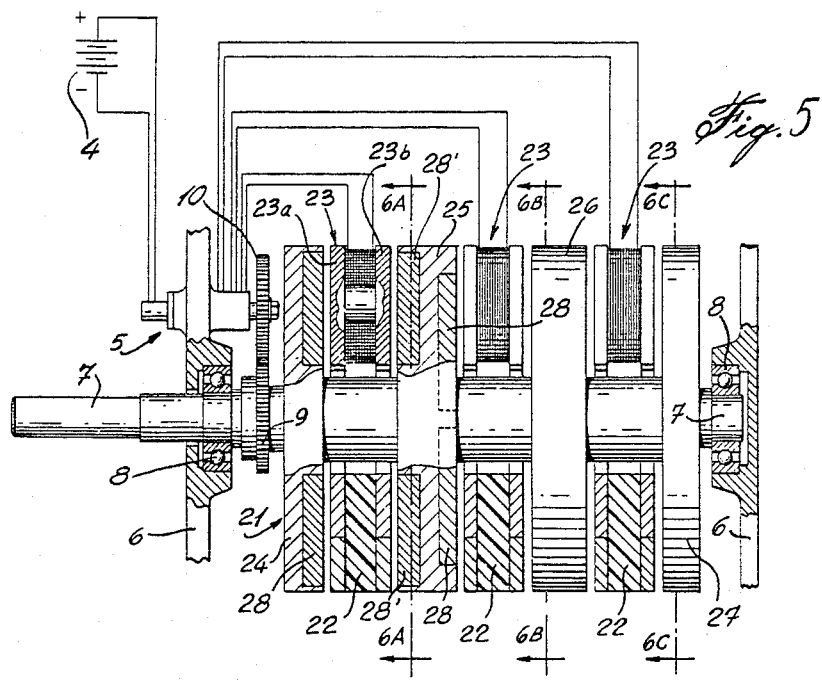
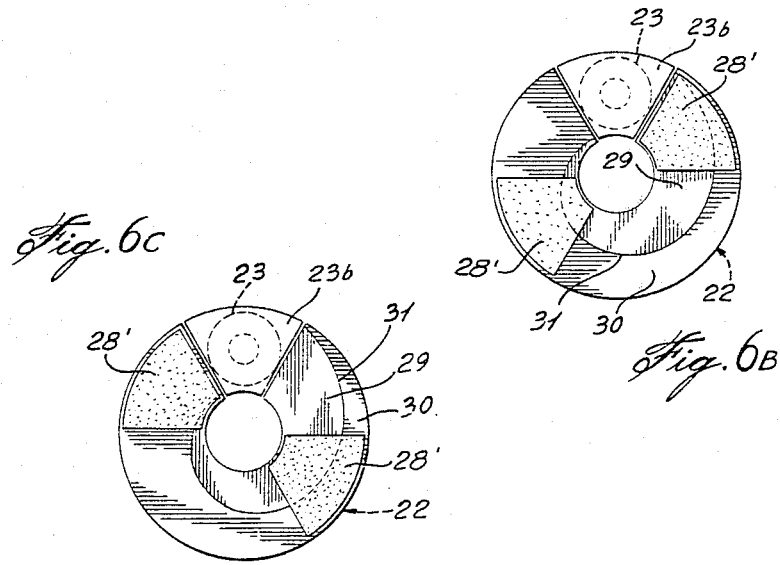

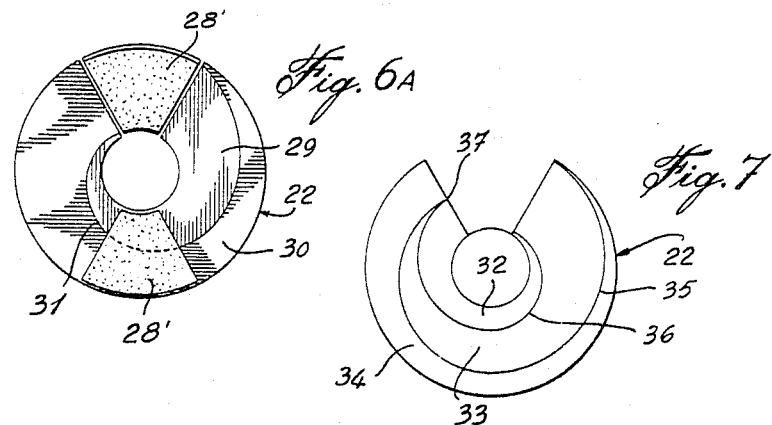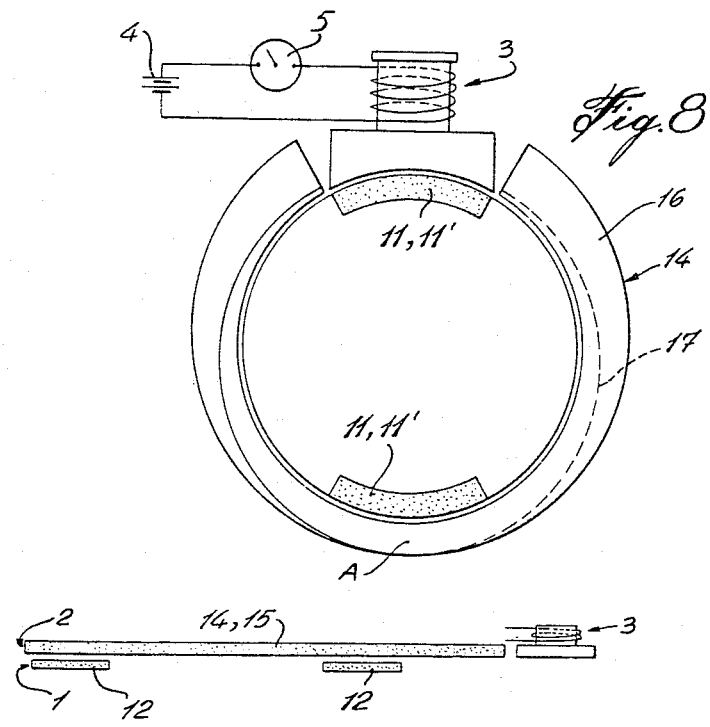

D.C. IMPULSION MOTOR

This invention relates to a d.c. motor or, in other words, to a motor energized by direct current.

In the conventional d.c. motors, direct current power is constantly supplied to it to keep it running and all of the torque is produced in reaction to the d.c. power supplied to it. There results a continuous use of energy to produce a given torque. Therefore, such motor is provided with substantial windings that make it relatively heavy and a poor contender for use in electric cars. In the Popular Science of June 1979, pages 80–81, there is defined a d.c. motor of special construction, called a "Magnetic Wankel", in which a circumferentially widening gap between permanent magnets of the rotor and the stator is put into contribution to produce a repulsive torque to maintain the rotor speed subsequent to an the impulsion by an electromagnet on a permanent magnet of the rotor. The widening gap is used to produce a repulsive boost on the trailing edge of the permanent rotor magnet. In that motor, the electromagnet thus needs energization for about only 1/6 of the time. Therefore, for a short duration which enables to use an electromagnet of smaller size and weight than in a conventional motor, the electromagnet accepting a greater amperage without excessive heating. However, the above-mentioned Magnetic Wankel presents inherent disadvantages related to its use of a non-cylindrical stator construction and to its increasing air gap that is counter-productive at its wider end, since little of the permanent magnet force of the stator reaches the permanent magnet of the rotor to act thereon. To counter this decrease of intensity of the magnetic field, the stator magnet must be relatively big and, thus, heavy and that diminishes the weight advantage gained by the removal of windings in the motor.

It is a general object of the present invention to provide a d.c. motor that avoids the above-mentioned disadvantages.

It is a specific object of the present invention to provide a d.c. impulsion motor wherein the permanent magnets which are used therein have a uniform air gap for obtaining optimum magnetic force and field.

It is a more specific object of the present invention to provide a d.c. impulsion motor which is magnetically driven by circumferentially increasing and decreasing magnetic fields produced by permanent magnets of progressively increasing and decreasing cross-sectional size, such as width.

It is still another object of the present invention to provide a d.c. impulsion motor that is magnetically driven in part by one magnet of one polarity tapering in width in one circumferential direction and an adjacent other magnet of opposite polarity tapering in width in the other circumferential direction for optimum use of the available stator space.

It is a still further object of the present invention to provide a d.c. impulsion motor that is relatively light and is particularly suitable for use in an electric car.

The above and other objects and advantages of the present invention will be better understood with reference to the following detailed description of preferred embodiments thereof, which are illustrated, by way of example, in the accompanyind drawings, in which:

FIG. 2 is a developed view of the stator and rotor permanent magnet arrangement and taken along line 3C—3C of FIG. 1;

Figure 1:
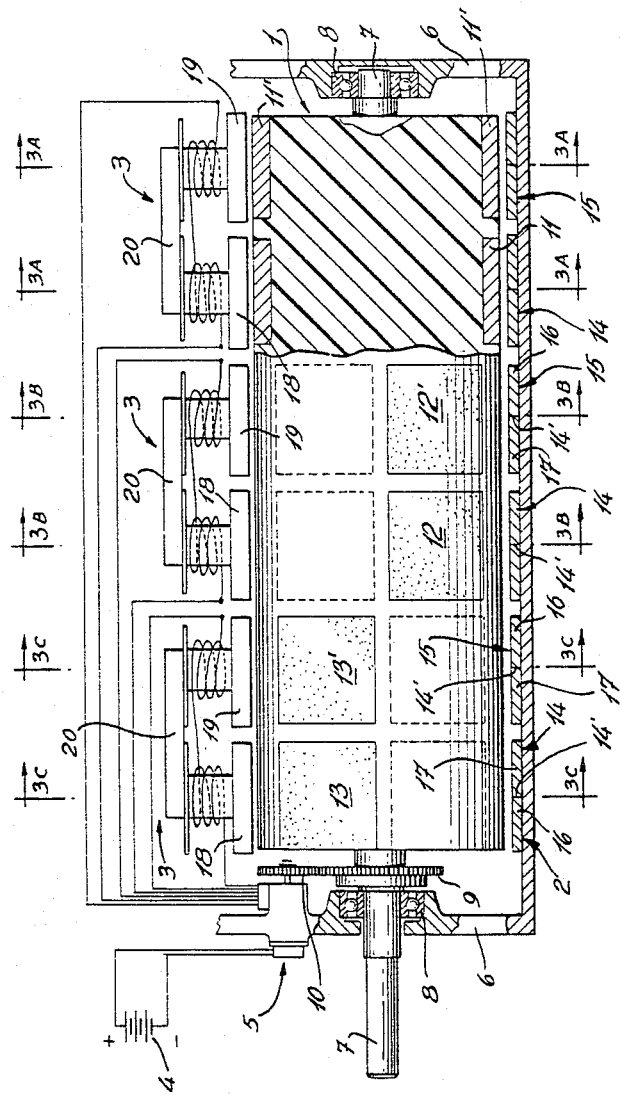
FIG. 1 is a schematic side view with parts broken away of a d.c. impulsion motor according to a first embodiment of the present invention.

FIGS. 3A, 3B, and 3C are cross-sectional views as seen along the corresponding lines 3A-A, 3B—3B and 3C—3C in FIG. 1;

FIG. 4 is a view of the stator and rotor magnet elements as seen from view line 4—4 in FIG. 2;

FIG. 5 is a schematic side view with parts broken away of a d.c. impulsion motor according to a second embodiment of the present invention;

FIGS. 6A, 6B, and 6C are cross-sectional views as seen along the corresponding lines 6A—6A, 6B—6B, and 6C—6C in FIG. 5;

FIG. 7 is a view similar to FIG. 6A, of a modified stator; and

FIG. 8 is a view similar to FIG. 3A, but showing a modified stator.

The d.c. impulsion motor illustrated in FIGS. 1 to 3C inclusive includes a rotor 1, a stator 2, electromagnets 3, a d.c. power supply in the form of a battery 4, and a d.c. power distributor 5. A casing 6, only fragmentarily shown in FIG. 1, forms part of the stator and is of any appropriate shape to operatively and rotatively support the axis 7 in bearings 8. The d.c. power distributor 5 is of any conventional or known construction, is connected to the battery 4 and is synchronously driven by the intermeshing timing gears 9 and 10 fixedly secured on the axes of the rotor 1 and distributor 5, respectively.

The d.c. impulsion motor in either of the two illustrated embodiments comprises a three-stage assembly but it should be easily understood that different numbers of stages are possible.

In the embodiment of FIGS. 1 to 3C inclusive, the rotor 1, as shown in FIG. 1, is provided with peripheral permanent magnets 11, 11′, 12, 12′, and 13, 13′ for the first, second, and third stages, respectively. There are thus formed six pairs, 2 for each stage, of diametrically-opposed permanent magnets secured to the cylindrical surface of the rotor and with the two permanent rotor magnets for anyone pair angularly offset 60° relative to an adjacent pair, so that the pairs are uniformly angularly spaced apart around the rotor 1.

The stator 2 is provided with six stator permanent magnet assemblies, two for each stage, namely: a permanent magnet assembly 14 and a permanent magnet assembly 15, of opposite polarities. These assemblies 14, 15 are laterally spaced apart from each other axially of the rotor 1 and longitudinally extend circumferentially around the stator. They are in axial register with associated pairs of rotor magnets 11, 11′ to 13, 13′ and form an air gap therewith, which is constant around the rotor 1. As shown in FIG. 2, each assembly 14 or 15 is diagonally divided by a straight junction 14′ to form one permanent magnet 16 of one polarity at its inner surface and another permanent magnet 17 of the other polarity at its inner surface with the permanent magnet 16 progressively decreasing or tapering in width in one circumferential direction and the permanent magnet 17 progressively decreasing or tapering in width in the other circumferential direction. Each stator magnet assembly 14 and 15 is preferably of a predetermined width with the two permanent magnets 16 and 17 thereof varying in width complementarily to each other and together, coextensively with the predetermined width of the corresponding permanent magnet assembly. Each assembly 14 and 15 longitudinally extends short of the full circumference by an angular distance approximately equal to the angular circumferential distance defined by one permanent rotor magnet 11, 12, or 13, or 11', 12' or 13'.

In the angular circumferential space thus left around the stator 2, there are mounted three electromagnets 3, each formed with a pair of opposite poles or heads 18 and 19 of opposite polarities defined at the opposite ends of a common armature 20 around which is correspondingly coiled a d.c. supply conductor connected to a corresponding output terminal of the distributor 5 to timely polarize each of the six armature poles.

Each rotor magnet 11, 12, 13, and 11', 12', 13' is of the same polarity as the axially-registering electromagnet heads 18 and 19, respectively, so as to be repulsed by the registering head.

Each permanent rotor magnet 11, 12, 13, and 11', 12', 13' is of the same polarity relative to the polarity of the inner surface of that one of stator magnet 16 or 17 that decreases in width in the desired circumferential direction of rotation.

Referring to FIGS. 1 and 2, if the rotor is to rotate in the direction indicated by arrow A and armature pole 18 is positive when energized, then rotor magnets 11, 12, 13 are positive and also stator magnets 16. Stator magnets 17 are negative. Since armature pole 19 is negative when armature pole 18 is positive, rotor magnets 11', 12' and 13' are negative and the relative position of stator magnets 16 and 17 is reversed for each stator magnet assembly 15.

Referring to FIG. 2, it is seen that the trailing area of each rotor magnet 13 is subjected to a greater magnetic repulsion than its leading area by stator magnet 16 and to a smaller magnetic attraction than its leading area by stator magnet 17. In both cases, the resulting torque is in direction A. This torque is twice that which would be obtained if only one stator magnet 16 or 17 was present. Measurement B expresses the difference between the trailing and leading surfaces of stator magnets 16 and 17 opposite rotor magnets 13 at anyone time. The torque exerted on the rotor is substantially constant through the angular extent of each stator magnet assembly 14 or 15.

This torque can still be increased by varying the thickness as well as the width of the stator magnets. This is shown in FIG. 8, wherein stator magnet 16' and 17' decrease in thickness in the direction of their respective tapering. Therefore, the differential of magnetic repulsion and attraction exerted on the leading and trailing area of each rotor magnet 13 is increased relative to the use of stator magnets of uniform thickness. It is noted that the air gap is constant.

When a rotor magnet 11, 12, 13 or 11', 12', 13' leaves the trailing area of its axially-registering stator magnet 16 or 17, 16' or 17', it is attracted by the latter; however, this attraction force is overcome by the afore-mentioned torque in direction A, and the latter is sufficient to push, for instance, rotor magnet 12 of FIG. 38 to a position passed the position of rotor magnet 11 in FIG. 3A. When a rotor magnet has moved a little beyond its dead center position relative to its associated electromagnet 3, the latter is energized to repulse the rotor magnet. When the latter has reached the position shown by rotor magnet 13 at the top right of FIG. 3C, energization of electromagnet 3 is stopped and the cycle is repeated. Since there are two permanent rotor magnets 11, 12, or 13 or 11', 12', 13 corresponding to each electromagnet pole 18 or 19, there are two energizations and electromagnetic impulses per cycle of rotation of the rotor by each electromagnet. Those electrical energizations are sequentially timed by the gears 9 and 10 and the distributor 5 to occur one after the other during each cycle of rotation for the three stages respectively of the motor.

In the embodiment of FIGS. 5, 6A, 6B, and 6C, the parts or elements which are similar to corresponding parts or elements of the afore-described embodiment, are identified by the same reference numerals and need not be described in detail again. In fact, elements 4 to 10 inclusive of the afore-described embodiment are also embodied in this second embodiment and perform the same functions.

The d.c. impulsion motor illustrated in FIG. 5 is a three-stage motor and includes a rotor 21, a stator defined by the fixed discs 22, electromagnets 23, a battery 4 and a distributor 5. The rotor 21 comprises a pair of end discs 24 and 27 and a pair of intermediate discs 25 and 26 that are axially spaced apart on the axis 7 of the rotor and secured thereto. The inner radial face of the two end discs 24, 27 and both radial faces of intermediate discs 25, 26 are each provided with a pair of permanent rotor magnets 28 and 28'. The latter are diametrically arranged and are trapezoidal in shape and open about 58°. Each of the three stages of the motor comprises one stator 22 and the rotor discs 24 or 27 and/or 25, 26 and their rotor magnets 28, 28' facing the stator. The rotor magnets 28 and 28' of each stage are in axial register. The rotor magnets of each successive stage are angularly spaced 60° relative to the rotor magnets of an adjacent stage. Therefore, these rotor magnets extend fanwise around the full circumference of the rotor 21, as do the rotor magnets 11, 12, 13 or 11', 12', 13' in the other embodiment. A constant air gap is provided between each rotor magnet and opposite stator magnets.

The stator comprises fixed disc sectors 22 spanning about 300° and an electromagnet 23 fitting within each disc sector. Each electromagnet 23 has two opposite poles 23a, 23b interconnected by an armature surrounded by a wire winding conncted to the distributor, as in the first embodiment. When the wire winding is energized, poles 23a and 23b have opposite polarities. Each stator disc sector carries on each of its radial faces a permanent magnet assembly composed of two spiral-shaped stator magnets 29, 30 of opposite polarities disposed side by side and separated by a spiral-shaped junction line 31. Radially inner stator magnet 29 decreases in width while radially outer stator magnet 30 increases in width relative to the direction of rotation. A modified stator magnet assembly is shown in FIG. 7. Each assembly is composed of three spiral-shaped magnets 32, 33, and 34 disposed side by side and separated by junction lines 35 and 36.

Stator magnets 32 and 34 gradually widen while stator magnet 33 gradually tapers in the clockwise direction. Stator magnets 32 and 34 are of the same polarity at their external face while stator magnet 33 is of opposite polarity.

The stator magnet assembly forms an annulus of equal radial width and stator magnet 33 starts with full annulus width and ends in a point 37 in the clockwise direction. Point 37 is located about centrally of the annulus radial width. With this arrangement, a uniform torque is obtained.

The polarities of the permanent stator and rotor magnets are as in the first embodiment. Rotor magnets 28 and 28' have opposite polarities, since they face electromagnetic poles 23a and 23b of opposite polarities and must have a repulsive interaction therewith.

Stator magnets 29 and 33 have a polarity such as to have a repulsive interaction with the rotor magnets 28 or 28' facing the same, it being understood that the rotor rotates in clockwise direction when the motor is viewed as in FIGS. 6A to 6C and in FIG. 7. In this way, the trailing area of each rotor magnet 28 or 28' is subjected by stator magnet 29 or 33 to a greater magnetic repulsion than its leading edge.

In FIGS. 6A to 6C and in FIG. 7, it is supposed that the rotor turns in clockwise direction.

What I claim is:

1. A d.c. impulsion motor comprising a stator including permanent magnet means having one polarity spread over at least one distinct polarity portion progressively varying in effective cross-sectional size in one circumferential direction around the stator a rotor including permanent magnet means having one permanent rotor magnet extending over a predetermined angular portion thereof, in adjacent and reactive path relationship relative to said one distinct polarity portion of said permanent magnet means, a uniform air gap being provided between the permanent magnet means of said stator and rotor, respectively, electromagnet means secured to the stator in circumferential continuity with said permanent magnet means and positioned in adjacent and reactive relationship relative to said one permanent rotor magnet, a d.c. power supply, and a d.c. power distributor connected to the d.c. powersupply and to the electromagnet means and constructed and arranged for synchronized energization of the latter upon passage of said one permanent rotor magnet in angular registry with said electromagnet means.

2. A d.c. impulsion motor as defined in claim 1, wherein the permanent magnet means of the stator has the other polarity spread over at least another distinct polarity portion progressively varying in effective cross-sectional size in the other circumferential direction around the stator.

3. A d.c. impulsion motor as defined in claim 2, wherein the permanent magnet means of the stator comprises at least one polarized surface unit of predetermined width, and having a plurality of distinct polarity portions including said one and said another distinct polarity portions and varying in width complementarily each relative to another and together coextensively with the predetermined width of said one polarized surface unit.

4. A d.c. impulsion motor as defined in claim 2, wherein the permanent magnet means of the rotor includes said one permanent rotor magnet and another permanent rotor magnet axially spaced apart from each other, the electromagnet means includes one armature and electrical coil means extending around said one armature and cooperatively forming therewith opposite armature faces of opposite polarities, the permanent magnet means of the stator having said one and said another distinct polarity portions respectively in opposite polarity relationship.

5. A d.c. impulsion motor as defined in claim 1, 2 or 4, wherein the permanent magnet means of the rotor and the stator are cylindrically arranged coaxially to each other.

6. A d.c. impulsion motor as defined in claim 1, 2 or 4, wherein the permanent magnet means of the rotor and the stator are axially juxtaposed relative one to another.

7. A d.c. impulsion motor as defined in claim 4, wherein the permanent magnet means of the stator comprises a pair of polarized surface units of predetermined width, longitudinally extending circumferentially of the stator, and including each a plurality of distinct polarity portions including said one and said another distinct polarity portions respectively, and with the plurality of distinct polarity portions of each unit varying in width complementarily each to another and together coextensively with the predetermined width of the corresponding polarized surface unit and including at least a second distinct polarity portion progressively varying in effective width in the other circumferential direction around the stator.

8. A d.c. impulsion motor as defined in claim 7, wherein the permanent magnet means of the stator comprises a plurality of polarized surface units spaced apart axially of the rotor and defining a plurality of motor stages, the permanent magnet means of the rotor comprises a plurality of permanent rotor magnets registering with the polarized surface units and cooperatively defining therewith the plurality of motor stages, and the electromagnet means comprises a plurality of electromagnet poles operatively registering with the permanent rotor magnets and producing magnetic impulses on
  the latter upon synchronized energization by the
  d.c. power distributor.

9. A d.c. impulsion motor as defined in claim 8, wherein the polarized surface units and the permanent rotor magnets extend cylindrically coaxially with the axis of the rotor.

10. A d.c. impulsion motor as defined in claim 8, wherein the polarized surface units and the permanent rotor magnets are positioned axially adjacent one to another.

11. A d.c. impulsion motor as defined in claim 1, wherein said polarity portion of said stator progressively decreases in thickness in one circumferential direction.

12. A d.c. impulsion motor as defined in claim 7, wherein said polarity portions of said stator progressively decrease in thickness in opposite circumferential directions.

* * * * *